United States Patent [19]

Schmidt

[11] 3,724,386
[45] Apr. 3, 1973

[54] ABLATIVE NOSE TIPS AND METHOD FOR THEIR MANUFACTURE

[75] Inventor: Donald L. Schmidt, Dayton, Ohio

[73] Assignee: The United States of America as represented by the Secretary of the Air Force, Washington, D.C.

[22] Filed: June 24, 1970

[21] Appl. No.: 49,406

[52] U.S. Cl..................................102/105, 161/70
[51] Int. Cl..............................................F42b 15/00
[58] Field of Search.......................102/105; 244/123

[56] References Cited

UNITED STATES PATENTS

| | | | |
|---|---|---|---|
| 3,270,503 | 9/1966 | Meyer, Jr. | 102/105 X |
| 3,536,011 | 10/1970 | Kinnaird | 102/105 |
| 3,430,898 | 3/1969 | Parechanian | 244/123 |

Primary Examiner—Robert F. Stahl
Attorney—Harry A. Herbert, Jr. and Cedric H. Kuhn

[57] ABSTRACT

An ablative nose tip assembly is produced by fabricating a nose tip comprising a rod having one of its ends flared so as to form a round, arcuate cap, inserting the rod into one end of an elongated housing so that the flared end of the rod seats in a correspondingly flared recess in the end of the housing, and locking the rod in position in the housing. The rod is composed of an unidirectional filament reinforced plastic or carbonaceous matrix composite while the housing is comprised of a fiber reinforced resin composite or a fiber reinforced pyrolyzed matrix composite. The nose tip assembly is dimensionally stable, rendering it useful in high speed aerospace vehicles subjected to intense aerodynamic heating and stagnation pressures during passage through a planetary atmosphere.

9 Claims, 2 Drawing Figures

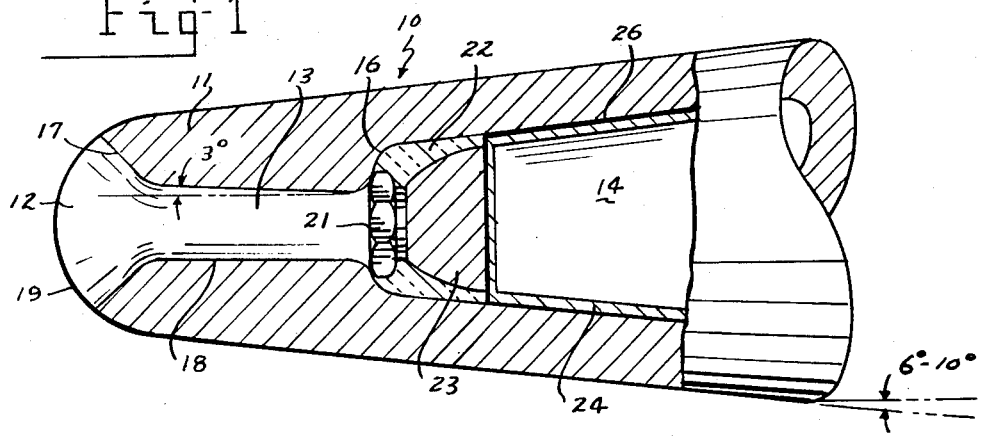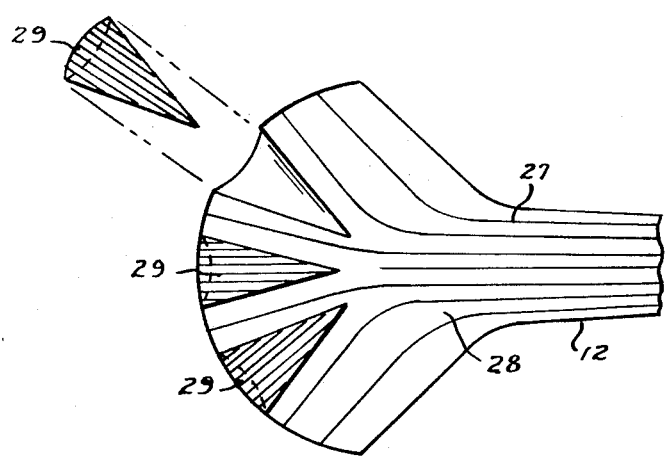

ABLATIVE NOSE TIPS AND METHOD FOR THEIR MANUFACTURE

BACKGROUND OF THE INVENTION

1. Field of the Invention

The invention deals with new heat shielding material compositions and constructions, which are suitable for protecting the nose tips of aerospace vehicles traveling at hypersonic speeds in a planetary atmosphere. Specifically, the invention relates to low recession nose tip constructions, which are comprised of an oriented fiber or fabric reinforced composite and containing a centrally located rod of unidirectional filament reinforced composite. The invention also deals with the use of said nose tip constructions in hypervelocity flight vehicles which are exposed to extremely high aerodynamic heating or very high environmental temperatures.

The term "unidirectionally reinforced" as used herein means that the filaments are substantially parallel to each other, separated from each other by a surrounding matrix, and for a substantial portion of the length thereof are oriented essentially parallel to the central axis of the nose tip. The term "pyrolyzed matrix" as used herein means a carbonaceous or graphitic composition derived by chemical vapor-depositing elemental carbon by means of thermal decomposition of a hydrocarbon gas, or pyrolyzing organic substances like phenolic resin or coal tar pitch at elevated temperatures and in the absence of oxygen to form a residual carbonaceous matrix.

2. Description of the Prior Art

Nose tips for advanced planetary hypersonic flight vehicles represent a compromise between the intended mission, the thermostructural aspects of the environment, the rate and magnitude of vehicle deceleration permitted, required accuracy, and available materials. To resist deleterious heating and pressure effects associated with very high speed re-entry and minimum vehicle deceleration, new and improved materials are required with greater shape stability, lower linear ablation and improved weight/volume efficiency.

Scientific probes and flight vehicles traveling at hypersonic speeds and within a planetary atmosphere may require the use of a streamlined shape, such as, for example, 6 to 12 degrees half angle cones, to minimize incident radiative heating, reduce aerodynamic drag and deceleration, and obtain planetary impact at a predetermined point. Nose tip configurations for these missions involve small radii on the order of only 0.5 to 2.0 inches. Shape stability is desired, but not achievable with state-of-the-art fiber or fabric reinforced composite materials.

When recession is encountered during aerodynamic heating, it must be held to an absolute minimum. Moreover, the ablation should be symmetrical in nature to maintain vehicle trim. Peak heating rates vary between 500 to over 30,000 $Btu/ft^2$-sec, peak stagnation pressures range from about 30 to over 200 atmospheres, and heating times are on the order of 20 to 40 seconds.

The most severe environmental conditions are encountered at the stagnation point and the sonic gas flow point on the vehicle nose tip. Thermal degradation of material is thus most rapid in this region of the nose tip. High imposed stagnation pressures require nose tip materials with a high compressive strength and modulus of elasticity to withstand the imposed forces. In addition, angle of attack flights and changes in flight path angle impose additional bending moments on the nose tip. Materials employed in the nose tip must therefore have high tensile and flexural strengths and stiffness to withstand these mechanical forces. This demanding set of thermal and mechanical requirements coupled with the fact that relatively little mass is available in the region of a small angle nose tip to accommodate these requirements has led to significant thermal and mechanical failures of vehicle nose tip materials.

Nose tips of hypersonic re-entry vehicles have been typically constructed of an ablative plastic composite which is adhesive bonded to an underlying structural metallic shell. The ablative plastic composite has typically been composed of about 50 to 70 weight percent of asbestos, glass, silica, quartz, carbon or graphite fabric or fiber with an organic charring resin like phenol formaldehyde. The fibrous reinforcement has typically been oriented downstream to the external gas flow and generally at a 20 degree angle to the nose tip axis. While this method of construction has proven satisfactory for blunt nose tips experiencing relatively mild heating and pressure environments, greatly improved ablation resistance and tip shape stability is required in nose tips intended for planetary atmospheric entry flight at 25,000 to about 60,000 feet per second and at high entry angles to the planet. It has been shown experimentally that state-of-the-art silica fabric reinforced phenolic nose tip materials erode about 0.231 inch per second when exposed to heating rates of about 5583 $Btu/ft^2$-sec and stagnation pressures of 48 to 56 atmospheres. Moreover, these nose tips lose material and change shape during aerodynamic heating with undesirable effects on the aerodynamic characteristics of the vehicles. Efforts to counter these undesirable composite characteristics by various orientations of the reinforcement have been unsuccessful. For example, nose tips fabricated entirely of unidirectional filament reinforced plastics have lacked adequate shear stress resistance, ablated in an unpredictable and non-uniform manner, and conducted heat internally at a rapid rate with attendant destruction of internally comtained heat-sensitive components.

Commercially available monolithic graphite materials have been employed in nose tips to minimize mass loss and maintain shape stability. This type of material must be kept relatively thin to minimize thermal stresses due to low thermal properties, but adequate thickness is required to carry the mechanical loads of re-entry. These competing requirements coupled with a lack of novel design configurations have led to significant nose tip failures during re-entry flights.

OBJECTS OF THE INVENTION

It is an object of this invention, therefore, to provide for space vehicles small angle nose tips which exhibit very high dimensional stability during re-entry heating and high strength and stiffness to withstand the imposed aeroloading.

Another object of the invention is to provide for space vehicles a nose tip which undergoes a minimum mass loss with only minor influences on vehicle flight stability and maintains excellent shape stability to minimize changes in flow field or heating.

A further object of the invention is to provide a nose tip having a structure capable of withstanding very high bending moments.

Still another object of the invention is to provide a nose tip composite material which has excellent dimensional shape stability during exposure to intense heating and high mechanical forces encountered by very high speed planetary entry flight vehicles.

Yet another object of the invention is to provide a method for fabricating a nose tip.

A still further object of the invention is to provide a method for fabricating a nose tip assembly comprising the nose tip and a housing therefor.

Other and further objects of the invention will become apparent to those skilled in the art upon consideration of the accompanying disclosure and the drawing in which:

FIG. 1 is an elevational view, partly in section, illustrating the nose tip assembly of this invention, and FIG. 2 is a schematic representation of the structure of the nose tip.

SUMMARY OF THE INVENTION

The present invention in one embodiment resides in a nose tip and in an assembly that comprises the nose tip and a housing or body therefor. Broadly speaking, the nose tip comprises a rod-shaped composite of unidirectional filaments bound together with a matrix material; at least one wedge, preferably conical in shape, formed of the same or similar composite, inserted in one end of the composite to flare that end; and a round, arcuate cap formed on the flared end of the rod-shaped composite. The matrix generally comprises from about 20 to 50 weight percent of the rod-shaped and wedge-shaped composites. The nose tip assembly comprises an elongated housing having an opening therein coincident with its longitudinal axis, and a rod member having one of its ends flared so as to form a round, arcuate cap, the rod member being fixedly positioned in the housing opening with its flared end seated in a correspondingly shaped flared recess in an end of the housing.

In another embodiment, the invention lies in a method for fabricating the nose tip which comprises forming a rod-shaped composite of unidirectional filaments impregnated with a resin; inserting at least one wedge formed of the same or similar composite into one end of the rod-shaped composite thereby flaring the end; placing the rod-shaped composite with flared end in a mold conforming to the shape of the composite; subjecting the composite to elevated temperatures and pressures for an extended period of time so as to cure the resin; removing the composite from the mold; and machining the flared end in the shape of a round arcuate cap. In still another embodiment a nose tip assembly is fabricated by inserting the nose tip, produced as described above, in a housing so that the flared end seats in a correspondingly shaped flared recess in the housing opening, and securing the nose tip in a fixed position in the housing.

It has been discovered that the nose tip of this invention is not subject to the limitations of the prior art fabric or fiber reinforced nose tip composites. Thus, the present nose tip possesses exceptional dimensional stability, excellent shape stability, and high strength and stiffness. These unexpectedly outstanding properties result from the unique structure imparted to the nose tip by its method of fabrication.

Referring now to the drawing and in particular to FIG. 1, nose tip assembly 10 comprises an elongated housing or body 11 and a rod member or core 12. The exterior of the housing is conical in shape, the surface forming a half angle with the longitudinal axis of about 6° to 20°, preferably 6° to 10° as shown in the figure. Formed in the central portion of the housing is a passageway which is generally circular in cross section. The longitudinal axis of the passageway substantially coincides with the longitudinal axis of the housing. The upstream portion 13 of the passageway has a smaller diameter than that of the downstream portion 14. As a result a shoulder 16 is formed where these two portions of the passageway meet. The upstream portion 13 of the passageway is tapered outwardly about 2° to 3° from its longitudinal axis, the taper extending from about its inner end to the beginning of the flared recess 17 formed in the upstream end of the housing. The downstream portion of the passageway is in the shape of a frustum with the small diameter end thereof being adjacent the inner end of upstream portion 13.

Positioned within upstream portion 13 of the passageway is rod member 12. The rod member comprises a rod 18 having its outer end flared so as to form a round, arcuate cap 19. Upon insertion of the rod member into the passageway, the flared end is seated in flared recess 17 in the upstream end of the housing. Also, rod 18 is tapered inwardly about 2° to 3° from its longitudinal axis so that there is a close fit between the rod and the wall of the housing passageway. The rod member is secured in a fixed position in the passageway. As shown, the inner end of rod 18 is threaded and extends a short distance into downstream portion 14 of the passageway. A nut 21 screwed on the end of the rod bears against shoulder 16, thereby securing the rod member firmly in position.

An insulating material 22, such as fibrous carbon or quartz, surrounds the inner end of the rod and locking means 21. The purpose of the insulation is to minimize heat conduction from the end of the rod member to the adjacent housing. A ballast 23 formed of a heavy metal, such as tungsten, is disposed in enlarged passageway position 14 downstream from the rod member and abuts against the end of the rod. The ballast provides weight to the forward region of the nose tip assembly, improves aerodynamic stability of the space vehicle, and stores heat internally that is transferred to it from the rod member. The ballast is preferably in the substantial shape of a frustum with its smaller end pointing upstream to facilitate holding the insulation in place. Downstream from the ballast is a structural shell 24, which can be conveniently formed from a metal such as aluminum or magnesium. The shell is secured to the end of the ballast and to the passageway as by bonding with an adhesive 26. The shell provides space for the temperature sensitive components (not shown) of the nose tip assembly.

The nose tip comprises the rod member having one of its ends flared so as to form a round, arcuate cap. The rod member is formed of unidirectional reinforcing filaments bound together with a matrix. The unidirectional filaments are made of a material selected from the group consisting of glass, silica, quartz, boron nitride, carbon and graphite. The matrix binding the filaments together can be a material selected from the group consisting of vapor-deposited carbon, pyrolyzed organic resins, such as phenolics, pyrolyzed bland of coal tar pitch and an organic resin, and a pyrolyzed synthetic pitch, such as isotruxene. The housing is preferably fabricated from fabric or fiber reinforcement selected from the group consisting of quartz, carbon and graphite. Other materials suitable for use in manufacturing the nose tip and its housing as well as methods for their manufacture are discussed in detail hereinafter, particularly in the examples.

A better understanding of the structure of the nose tip can be obtained by referring to FIG. 2. Rod member 12 is composed of a plurality of continuous filaments 27 extending from one end of the rod to the other for maximum strength and stiffness. The filaments are bonded together by a matrix 28, thereby forming a composite. One or more wedges or sections 29, preferably conical in shape as illustrated and machined from the same or a similar composite of a unidirectional filament reinforced matrix as the rod, are driven into the end of the rod. The end of the rod is thereby expanded so that the sides are flared at an angle of about 40° to 50° with the axis of the rod. As described more in detail hereinafter, the rod with its flared end is subsequently cured in a mold and the flared end is machined to provide a nose tip with a round, arcuate cap.

DESCRIPTION OF PREFERRED EMBODIMENTS

A better understanding of the invention can be obtained from a consideration of the following examples which are not intended, however, to be unduly limitative of the invention.

EXAMPLE I

In a specific embodiment of this invention an unidirectional quartz filament reinforced phenolic composite rod is manufactured as follows. Quartz yarn (type 300-1/2, finish 9073, A-1100 silane binder, J. P. Stevens and Co., New York City) is immersed in a liquid resin bath of phenol formaldehyde laminating varnish (SC-1008, 60% solid, Monsanto Chemical Co., St. Louis, Mo.). The quartz yarn is slowly and continuously drawn through the liquid resin with immersion times of 3 minutes or sufficient time to obtain 20 to 25 percent by weight resin pickup. The resin impregnated yarn is then wound in a single layer thickness on a 160°F. internally heated stainless steel drum containing a mold release agent (FreKote 33, Frekote, Inc., Indianapolis, Ind.). After heating at that temperature for an additional two hours, the material is no longer tacky. A portion of the prepreg is then removed and checked for desired resin content. Prepreg yarn containing excess resin is lightly wiped with isopropyl alcohol or other suitable solvent and then reheated for 30 minutes at 160°F. Prepreg containing less than 30 percent by weight resin is brush coated with additional liquid resin and reheated for 60 minutes at 160°F. The resin impregnated yarn is then slit from the drum and multiple strands of the impregnated roving are laid parallel to each other in a stainless steel cylindrical matched metal die mold. After prepreg yarn has been carefully laid in the mold to a depth of about 0.8 inch diameter, it is subjected to compression under a maximum force of 400 pounds per square inch or with sufficient force to squeeze excess resin from the die and yield a hard product containing about 20 to 30 percent by weight of B-staged resin. The resultant product is then removed from the mold and machined into conical wedge shaped specimens as shown in FIG. 2. A second resin impregnated B-staged rod is laid up in the cylindrical mold and compressed lightly to obtain a cylindrical shaped rod. Conical wedge shapes are then tapped into one end of the prepreg rod with a rubber mallet in order to expand the end of the rod up to about 50° with the central axis. On the opposite end of the rod, multiple layers of phenolic impregnated quartz fabric (Style FM-5318, the U.S. Polymeric, Inc., Santa Ana, Calif.) is tightly wound parallel to the rod axis until an additional 1 inch of rod diameter is added. The prepreg rod is then placed in a stainless steel die having the desired internal contour. The male and female sections of the mold are then closed to contact pressure, and the mold heated to 225°F. for 15 minutes. The pressure is then gradually increased to 100 pounds per square inch, after which the temperature is increased to 270°F. The pressure is again slowly increased to 1,000 pounds per square inch, the temperature increased slowly to 325°F. over a period of two hours, and then maintained at pressure and temperature for 1 hour. Residual solvent and volatiles emanating from the resin during curing are continuously released through small ports in the mold. After cooling over a period of three hours, the part is removed from the mold and placed in an air circulating oven. Postcuring of the part is then effected for 48 hours at 325°F. and atmospheric pressure, and the rod is then cooled to room temperature. It is finally machined to shape with a hemispherical cap on the expanded end and threaded on the other, fabric-containing end to accept a retaining steel nut (Hex, stainless steel, type 303, 1/2 - 13). The quartz filament reinforced phenolic resin composite prepared in this manner has a density of from about 112 to 118 pounds per cubic foot and a filament content from about 75 to 85 percent by weight.

A nose tip housing for the centrally located rod is then fabricated from quartz fabric and phenolic resin in the following manner. A stainless steel matched metal mold having an integral conical cavity is used to obtain the desired plastic part. Prepreg fabric is first prepared by immersing quartz fabric (Astroquartz type 570, 9073 finish, J. P. Stevens and Co., New York City) in a liquid resin solution of phenol formaldehyde resin (Type SC-1008, 60 percent solids, Monsanto Chemical Co., St. Louis, Mo.), for 10 minutes or sufficient time to pick up about 30 to 35 percent by weight of resin. The resin wet fabric is then removed from the bath and air dried for 48 hours or oven dried at 150°F. for 24 hours. At this point, the resin impregnated fabric is in the so called prepreg or B-stage. Individual layers of the prepreg are cut and shaped into a conical Dixie cup configuration, and stacked one on top of the other in the mold. Each fabric layer is thus oriented essentially 45° to the axis of the nose tip housing, and pointed upstream to the intended gas flow. After sufficient thickness of fabric prepreg has been added to the mold, the male mold is inserted in place and the prepreg compressed to 1000 pounds per square inch. The mold is then heated electrically to 320°F. over a period of 6 hours, maintained at temperature for two hours, and then reduced to room temperature and ambient pressure over a period of 2 hours. Volatiles released during resin curing are continuously vented through ports in the mold. After removing the part from the mold, it is post cured in an air circulating oven for 16 hours at 300°F. and atmospheric pressure. The reinforced plastic part is then machined to shape having a half angle from 6 to 20 degrees and an internal geometry as illustrated in FIG. 1. Composite material prepared by the preceding procedure has a density of about 108 pounds per cubic foot, an ultimate tensile strength of about 58,000 pounds per square inch, an elastic modulus of about 4,400,000 pounds per square inch and an ultimate strain of about 1.7 percent with all properties measured parallel to the fabric plies. Properties perpendicular to the fabric plies will be a tensile strength of about 2,300 pounds per square inch, a tensile modules of elasticity of about 1,670,000 pounds per square inch, and a strain at failure of 0.18 percent.

The machined unidirectionally quartz filament reinforced phenolic rod is then inserted into the nose cap region of the nose tip body. It is affixed in place from within the nose cap by using a nut (Hex, stainless steel, Type 303, 1/2 – 13). The nut is tightened until sufficient force is applied to minimize the gap between the centrally located rod and the nose tip housing. Quartz fibrous insulation (Astroquartz Mat, 3 lbs per cubic ft., J. P. Stevens and Co., Inc., New York City) is then packed around the steel nut to minimize heat conduction to the adjacent plastic composite nose tip. A tungsten ballast of appropriate size and configuration is then inserted behind the centrally located rod. An aluminum container for temperature sensitive elements is then adhesive bonded with a 0.02 inch thick high temperature epoxy (HT-424, Blomingdale Rubber Co., Aberdeen, Md.) to the tungsten ballast and the adjacent plastic composite walls.

Quite unexpectedly, I have found that nose tips prepared in the aforementioned method have very low linear and mass ablation rates and good shape stability while exposed to simulated reentry heating conditions. Specifically, nose tip composites composed entirely of quartz fabric reinforced phenolic resin with the reinforcement perpendicular to the walls of the nose tip will ablate at a rate of 0.45 inch per second when exposed to stagnation point heating rates of about 10,000 Btu per sq. ft. per second and a stagnation pressure of about 75 atmospheres. Nose tips containing a centrally located rod of unidirectionally reinforced quartz filaments and phenolic binder in a nose tip housing of quartz fabric reinforced phenolic in accordance with the teachings of this invention will have a surprising low ablation rate of only 0.19 inch per second when evaluated under identical conditions. In addition, the central rod containing nose tip will exhibit improved dimensional stability and a more aerodynamically slender configuration during ablative heating.

EXAMPLE II

Example I is repeated with the following modifications. The centrally located rod is fabricated with unidirectionally reinforced graphite filaments and phenolic resin and the adjacent nose tip body is composed of carbon fabric and a phenolic resin. A 30 inch diameter aluminum winding drum is first covered with a polyester film (Type 1000 Mylar A, Film Dept., E. I. duPont De Nemours and Co., Inc., Wilmington, Del.) and then preheated to 130°F. A thin layer of liquid phenolic resin (SC-1008, 60 percent solids, Monsanto Chemical Co., St. Louis, Mo.) is carefully and evenly brushed onto the Mylar film. Graphite yarn (WYG 130 1/2, Union Carbide Corp., Carbon Products Div., New York City) is then wound parallel to each other, under tension, and around the heated aluminum mandrel. The filaments will thus be embedded in the soft phenolic resin. After laying down a parallel layer of filaments onto the resin surface, a very thin coating of additional liquid phenolic resin is brushed onto the filaments. The mandrel is then slowly increased in temperature to 160°F. to slowly evaporate solvent from the resin. After the resin impregnated yarn is advanced to the state where it can be touched without tackiness, it is slit and removed from the mandrel. Multiple strands of the resin impregnated roving is then compressed in a mold as previously described in Example I and conical wedge shaped filament composites inserted into one end of the rod as described above. Carbon fabric reinforced phenolic resin prepreg (Type MX-4950 containing CCA-1 carbon fabric, a fine carbon filler and MIL-R-9299 Type II phenolic resin, Fiberite Corp., Winona, Minn.) is tightly wound around the opposite end of the rod. Curing of the part then proceeds as described in Example I, except that the pressure applied during rod curing is a maximum of 500 pounds per square inch. The cured rod has a density of about 90 pounds per cubic foot and about 80 percent by weight of filaments in the composite.

A nose tip housing containing carbon fabric essentially perpendicular to the nose tip surfaces and containing a phenolic resin (Type MX-4950, Fiberite Corp., Winona, Minn.) is fabricated in accordance with the specifications given in Example I except that a maximum pressure of 500 pounds per square inch is used during curing of the composite. When prepared in this manner, the composite nose tip housing has a density of approximately 84 pounds per cubic foot, a tensile strength of about 19,000 pounds per square foot, tensile elastic modulus of about 1,920,000 pounds per square inch, and a strain at failure of about 2.9 percent with all properties measured parallel to the fabric plies. Composite properties perpendicular to the fabric plies will be about 3,100 pounds per square inch tensile strength, approximately 1,690,000 pounds per square inch tensile elastic modulus and about 0.12 percent strain at failure.

The central core is inserted and contained in the nose tip housing as described in Example I, except as follows. The internal machined surfaces of the nose tip housing is first lined with 0.005 inch thick layer of exfoliated pyrolytic graphite (Type Grafoil, Carbon Products Div., Union Carbide Corp., New York City) and then the rod is inserted. The exfoliated pyrolytic graphite layer serves to insulate the central core from the housing and fill the gap between the core and the housing. The Grafoil is a pure, flexible, graphitic material with a density of about 1.2 to 1.8 gm/cc.

Evaluation of the nose tip composite at a stagnation point heating rate of about 10,000 BTU/ft$^2$-sec and a stagnation pressure of about 75 atmospheres will show that carbon fabric reinforced phenolic composite has an ablation rate of about 0.25 inch per second. A similar nose tip housing containing a central rod of unidirectional graphite filament reinforced phenolic will ablate at a rate of about only 0.18 inch per second. The rod containing nose tip will also have improved dimensional stability as compared to conventional nose tip specimens.

EXAMPLE III

Graphite filament reinforced polybenzimidazole resin composite rods are prepared according to Example II with the following exceptions. A steel winding drum is first covered with a thin layer of polytetrafluoroethylene coated glass fabric (Fluorglas, 0.003 inch thick, Style 180 glass, Dodge Industries, Inc., Hoosick Falls, New York) and then preheated to 250°F. A polybenzimidazole resin solution (Imidite 2803 which is a condensation of diphenyl isophthalate and 3,3'-diaminobenzidine, 20 percent solids in N-methyl pyrollidone solvent, Wittaker Corp., Narmco Materials Div., Costa Mesa, Calif.) was evenly brushed onto the heated drum until an approximate thickness of 0.003 inch layer of resin is laid down. Continuous graphite yarn is then wound under tension onto the drum with filaments parallel to each other and in a single layer. After laying down a sheet of filament prepreg, the resin content is checked. Prepreg containing less than 30 percent by weight resin is brush coated with additional resin solution. After each brush coating of resin, the material is dried an additional 30 minutes at 250°F. It is then dried 8 hours at 350°F., stripped from the drum while on the carrier fabric, cut to desired lengths, and placed on racks in a vacuum oven. Additional solvent is removed under vacuum by 5 hours degassing at 325°F. The prepreg is then removed from the vacuum oven, stripped from the fabric carrier, and laid up in a mold as described in Example II. The material is compressed at room temperature and under 300 pounds per square inch to rigidize the rod, and then conical shaped wedges are machined from the rod. An identical unidirectional graphite filament reinforced polybenzimidazole rod is then fabricated, conical wedges of similar material driven into one end of the rod, and prepregged carbon fabric reinforced polybenzimidazole tightly would around the opposite end of the rod. The fabric prepreg is prepared by immersing carbon fabric (Type CCA-1, Hitco, Gardena, Calif.) in a 20 percent polybenzimidazole solution for three hours, hanging vertically in an oven and drying for 30 minutes at 250°F., and then completing the prepregging operation as previously described for the unidirectional graphite yarn. After assembling the prepregged rod composite in a steel mold, the entire assembly is transferred to an inert nitrogen gas oven. The material is then held under contact pressure, heated to 200°F., and then compressed to 300 pounds per square inch. While held under pressure, it is then cured by increasing the temperature to a maximum of 700°F. over a period of three hours, held at temperature for 30 minutes, and finally the temperature is reduced to room temperature while under pressure. After releasing the pressure, the part is rough machined to remove excess resin on the external surfaces. The part is then placed in a stainless steel bag equipped with a gas line and heated in a nitrogen atmosphere in accordance with the following cycle: 24 hours at 600°F.; 24 hours at 650°F.; and 24 hours at 700°F. It is then cooled to room temperature over four hours and under dry nitrogen. The rod is then removed from the bag and machined to shape. The reinforced plastic composite rod prepared in this manner will have a resin content of about 28 percent by weight, a density of about 88 pounds per cubic foot, a flexural strength of about 120,000 pounds per square inch, and a flexural modulus of elasticity of about 28,000,000 pounds per square inch.

The graphite filament reinforced polybenzimidazole rod is then inserted into a nose tip housing of carbon fabric reinforced phenolic resin composite. The housing is prepared in accordance with Example II.

Evaluation of the central rod containing carbon fabric reinforced phenolic nose tip at a stagnation point heating rate of about 10,000 Btu/ft$^2$-sec and a stagnation pressure of about 75 atmospheres yields an ablation rate of only 0.14 inch per second. A similar carbon fabric reinforced phenolic resin nose tip without the central rod ablates at about 0.25 inch per second and exhibits poorer shape stability at identical simulated entry heating conditions.

EXAMPLE IV

Graphite filament reinforced polyimide resin composite rods are fabricated according to Example II and with the following exceptions. A steel winding drum is covered with a fluorocarbon impregnated glass fabric as described in Example III. Graphite yarn (Type WYG 130 1/2, Union Carbide Corp., Carbon Products Div., New York City) is immersed in a liquid solution of polyimide resin (Skybond 700, 60 percent solids by weight diluted to 40 percent solids in 1-methyl-2-pyrolidone, Monsanto Chemical Co., St. Louis, Mo.). The continuous graphite filaments are first passed over a graphite electrode roller, through the resin bath at a rate of three inches per minute, and then over a second graphite roller. A direct electrical current of 22 volts is applied to the graphite yarn while it is between the graphite roller electrodes. This will result in a fiber temperature of about 350°F. The resin bath is thus heated locally about the yarn and the lower viscosity resin then penetrates into the yarn bundle with greater ease. The graphite filaments are then wound onto the fabric covered steel drum, and spaced so as to obtain an adjacent layer of filament tape. The drum is then heated to about 160°F. for a period of one hour and externally by means of an electrically heated hot air gun. The prepreg is then cooled, slit, and removed from the drum. The prepreg tapes are subsequently placed in an air circulating oven, heated at 167°F. for 15 hours to remove solvent, and then heated to 248°F. for one hour to volatilize additional solvent. The prepreg is then placed in a stainless steel mold, compressed to 200 pounds per square inch, removed and machined into conical wedges. The wedges are then driven into a unidirectional rod of identical composition, and the opposite end of the rod tightly wrapped with carbon fabric reinforced polyimide prepreg. This prepreg fabric is prepared by immersing carbon fabric (Type CCA-1, Hitco, Gardena, Calif.) for 30 minutes in a polyimide resin bath previously described in this example. The wet fabric is then hung in an air circulating oven, heated to 160°F. for 15 hours, and finally heated to 250° for 1 hour. After tightly wrapping the pregregged fabric around the end of the rod, the entire assembly is transferred to a steel mold. A pressure of 25 pounds per square inch is applied. Over the next hour, the temperature of the mold is increased continuously to a maximum of 600°F. and the pressure is increased continuously to a maximum of 250 pounds per square inch. Volatiles are released from the resin during curing and are continuously vented from the mold through small ports. Composite curing at the same temperature and pressure is continued for 30 minutes, after which both temperature and pressure are slowly reduced to ambient conditions over a period of three hours. The part is then removed from the mold, surface resin machined away, and the article machined to shape.

Graphite filament reinforced polyimide resin composites prepared according to this invention will have a density of about 88 pounds per cubic foot, a tensile strength of about 110,000 pounds per square inch, a tensile elastic modulus of about 20,000,000 pounds per square inch, a flexural strength of about 110,000 pounds per square inch, and a flexural modulus of elasticity of about 21,000,000 pounds per square inch.

The graphite filament reinforced polimide rod is inserted into a nose tip housing of carbon fabric reinforced phenolic resin, which is prepared in accordance with Example II. Exposure of the graphite filament-reinforced polyimide rod containing nose tip to air heating of about 10,000 Btu/ft²-sec and a stagnation pressure of about 75 atmospheres causes a linear ablation rate of about 0.17 inch per second. An all carbon fabric reinforced phenolic tip has an ablation rate of about 0.25 inch per second.

EXAMPLE V

Thermally and dimensionally stable nose tip composites containing essentially carbonaceous or graphitic matrices reinforced with carbonaceous or graphitic fibrous reinforcements are fabricated in accordance with the following procedures. A unidirectional filament reinforced plastic rod and a fabric reinforced plastic nose tip housing are first manufactured in accordance with the teachings of Examples II, III, and IV. The articles are fabricated oversize by about 15 percent and not machined to final dimensions. They are then subjected to controlled pyrolysis conditions in a non-oxygen containing environment to obtain thermally and dimensionally stable materials. The individual plastic composite articles are placed in a graphite container and completely surrounded by a mixture of sawdust and finely divided particle calcined coke. The container with the articles is placed in an electric furnace through which an inert gas like nitrogen, argon or helium is slowly passed. The container is then heated slowly from room temperature to 1,900°F. over a period of 10 hours. Upon reaching temperature, the container is allowed to cool to room temperature over an additional 10 hours. The articles are then removed from the furnace and the container. At this step of the processing, the articles are noted to have lost weight due to partial vaporization of the resinous matrix and exhibit some shrinkage due to pyrolysis. The graphite filament reinforced phenolic rod loses about 13% by weight depending upon the initial resin content, has a density of about 82 pounds per cubic foot, a flexural strength of about 35,000 pounds per square inch, and a flexural modulus of elasticity of about 13,000,000 pounds per square inch. The graphite filament reinforced polybenzimidazole rod loses approximately five to nine percent by weight during exposure to carbonization temperatures. In carbonized form, the composite has a density of about 80 pounds per cubic foot, a flexural strength of about 40,000 pounds per square inch, and a flexural elastic modulus of about 16,000,000 pounds per square inch. The graphite filament reinforced polyimide rod loses about 11 percent by weight, and in carbonized form, it has a density of about 81 pounds per cubic foot. All articles thus carbonized have porosities on the order of 15 to 30 percent and exhibit matrix shrinkages from about 3 to 10 percent perpendicular to the axis of the reinforcement. The articles are then rough machined to remove excess carbonized resin from the external surfaces and then impregnated with phenolic resin (Type SC-1008, 60 percent solids, Monsanto Chemical Co., St. Louis, MO.). The rods and housings are placed in a pressure vessel and separated from each other. After evacuating the chamber to about 6 millimeters of mercury pressure and heating to 150°F. for one hour, phenolic resin heated to 150°F. is admitted to the chamber. The vacuum and a resin bath temperature of 150°F. are maintained for 1 hour or until the resin content has been increased to about 90 percent by weight by loss of solvent. This is typically 1 hour in duration. The heat input is then cut off and the chamber pressurized to 1500 pounds per square inch gravity using dry nitrogen gas. This forces liquid resin into all of the available open pores of the carbonized articles. The pressure is then slowly reduced over a minimum period of 6 hours. While containing the articles in the resin bath, the temperature of the pressure container is increased slowly to 150°F. and maintained at temperature for about 15 hours or until phenolic resin gellation has occured. The parts then are removed from the container and excess resin removed from the surfaces. The parts are then transferred to an air circulating oven, heated to 200°F. over a minimum period of 25 hours, cooled over a period of four hours to room temperature, and removed from the oven. Resin infiltrated into the open pores of the carbonized reinforced articles increases its density from about 4 to 8 percent by weight. The articles are then returned to a graphite container, and completely surrounded by a mixture of sawdust and finely divided particular calcined coke. The articles are then carbonized as previously described. After heating in an inert atmosphere at 1,900°F. for 20 hours, the container is heated to a graphitization temperature of 4,700°F. over a period of 8 hours, and held at temperature for an additional four hours. The parts are then cooled to room temperature while in an inert gas atmosphere and over a period of 10 hours. The parts are then removed, surfaces scraped to remove excess carbon, and phenolic resin impregnated according to the teachings of this example. Carbonization and graphitization is again accomplished as previously described. One or more additional phenolic resin impregnation, carbonization and graphitization cycles may be employed to further densify the composites. I have found, however, that three cycles of resin impregnation, carbonization and graphitization are adequate to yield dense, strong and stiff composites. A graphitized rod or graphite filament reinforced phenolic prepared by the aforementioned process and subjected to two cycles of resin impregnation, carbonization and graphitization has an elemental carbon content of 97 percent by weight, a density of about 93 pounds per cubic foot, a void content of about 9 percent, a flexural strength of about 58,000 pounds per square inch and a flexural elastic modulus of about 13,000,000 pounds per square inch. The graphitized rods and nose tip housing are then machined to shape, the central rod inserted into the housing and the rod affixed with a stainless steel nut.

Evaluation of the graphitized composite nose tips in arc heated air at an incident heating rate of about 10,000 Btu/ft$^2$-sec and a stagnation point pressure of about 75 atmospheres yields linear ablation rates of about 0.12 inch per second for the graphitized graphite filament reinforced polybenzimidazole rod contained in a pyrolyzed carbon fabric reinforced phenolic tip housing, about 0.14 inch per second for the graphitized graphite filament reinforced polyimide rod contained in a pyrolyzed carbon fabric reinforced phenolic tip housing, and about 0.16 inch per second for the graphitized graphite filament reinforced phenolic rod contained in a pyrolyzed carbon fabric reinforced phenolic tip housing. A graphitized carbon fabric reinforced phenolic nose tip has an ablation rate of about 0.18 inch per second.

EXAMPLE VI

A nose tip comprised of graphitized fibers with a graphite matrix is fabricated in accordance with the following. The central nose tip rod is machined as illustrated in FIG. 1 and composed of about 7 percent by weight of pyrolyzed rayon felt and 93 percent by weight of chemically vapor deposited pyrolytic graphite (Type 17100, Super Temp Co., Santa Fe Springs, Calif.). The rod axis is machined parallel to the major axis of the fibrous felt and perpendicular to the needled felt orientation in the composite. This machined rod has a density of 110 pounds per cubic foot, a tensile strength of 7,960 pounds per square inch parallel to the major fibrous felt orientation, and an elastic modulus of about 1,290,000 pounds per square inch. The short fiber reinforced pyrolytic graphite rod is then inserted into a machined nose tip housing of pyrolyzed carbon fabric reinforced phenolic resin composite, which is prepared in accordance with the teachings of Example V. The rod is affixed in place with a stainless steel nut.

Exposure of the aforementioned nose tip to arc heated air at an incident heating rate of about 10,000 BTU/ft$^2$-sec and a stagnation pressure of 75 atmospheres will cause a linear ablation rate of about 0.15 inch per second. Some spallation or irregular small pieces of nose tip material may be ejected from the surface of the central rod during high pressure ablation test, but functional use is still maintained because the rod is housed in the graphitized fabric reinforced composite. A graphitized carbon fabric reinforced phenolic resin nose tip without the fiber reinforced pyrolytic graphite rod has an ablation of about 0.18 inch per second.

A variety of synthetic organic matrices can be employed in making the fiber reinforced resin tip core and as the precursor for the pyrolyzed fiber reinforced matrix composite tip cores. The most desirable characteristics for these organic matrices are:
   a. solubility in a solvent in order to facilitate matrix impregnation of filamentous yarns;
   b. cure to hard and rigid polymeric substances at relatively mild elevated temperature, low pressures and short time conditions;
   c. cure with the formation of minimum volatiles and with minimum residual voids;
   d. cure to high elemental carbon contents;
   e. exhibit tendency to char in response to heating;
   f. maintain highest possible percentage of the original carbon content in the residual char;
   g. form a strong char residue;
   h. undergo pyrolysis in an orderly manner with minimum changes in dimensions during pyrolysis;
   i. form a char residue which is compatible with the reinforcing fibers;
   j. generate minimum voids in the residue char.

Organic matrices which are particularly suitable are synthetic aromatic and heterocyclic polymers, coal tar pitches, blends of charring polymers and coal tar pitches, and synthetic pitches. Each of these organic matrices will form 40 or more weight percent of a residual char product upon pyrolysis at a maximum temperature of 1,500°F. and in the presence of an inert gas such as nitrogen.

Organic matrices fulfilling this requirement and suitable for use in the teachings of this invention are preferably selected from the following types:
   1. phenolic resins prepared from a base-catalyzed reaction of phenol and formaldehyde with an excess of formaldehyde to yield a one state product soluble in alcohol;
   2. polyimide resins formed by the condensation of an aromatic tetrabasic acid anhydride and an aromatic diamine, such as from pyromellitic dianhydride and an amine selected from the group consisting of phenylenediamines, diaminodiphenyls or diaminodiphenylethers and contained in a suitable solvent like N-methylpyrrolidone;
   3. polybenzimidazole resins formed by the reaction of an aromatic tetraamine with an aromatic diacid or a diacid derivative, such as a polybenzimidazole resin prepared from 3,3', 4,4'-tetraaminobiphenyl and the phenyl ester of isophthalic acid;
   4. high charring modified phenolic resins derived from a basic catalysis of phenol-like compounds such as cresols, xylenols, p-t-butylphenol, p-phenylphenol, bisphenol and resorcinol with an aldehyde like formaldehyde or furfuryl aldehyde;
   5. phenyl silane resin formed by the reaction of a silane with phenol formaldehyde to yield a product soluble in isopropyl alcohol;
   6. polyamide-imide resins formed by the condensation reaction of a trimellitic dianhydride and an aromatic diamine;
   7. polyphenylene resins formed by cationic oxidative polymerization of biphenyl and m-terphenyl in the presence of a catalyst mixture of aluminum chloride and cupric chloride, the resultant polymer being mixed with xylene glycol and toluene sulfonic acid to obtain a suitable lacquer solution;

8. pyrrone resins prepared from the condensation reaction of an aromatic dianhydride and an aromatic tetraamine in a polar solvent like dimethylformamide, such as the polyimidazopyrrolone resin prepared from pyromellitic dianhydride with 1,2,4,5-tetraaminobenzene and soluble in dimethyl formamide;

9. polyquinoxaline resins obtained from polymerization of an aromatic bisglyoxal and an aromatic tetraamine, such as nonladder polymer obtained from the polymerization of 3,3'-diaminobenzidine and 1,4-diglyoxalbenzene in m-cresol solution followed by high temperature second staging, and the ladder polyquinoxaline resin, e.g. dibenzopyrazinophenazine formed by the condensation reaction of 1,2,6,7-tetraketopyrene and 1,2,4,5-tetraaminobenzene;

10. epoxy phenol novalak formed by the reaction of epichlorohydrin with polyhydroxy compounds such as bisphenol-A in the presence of a catalyst, and advantageously processed by reacting 100 parts by weight of epoxy novalak with 100 parts by weight of methyl nadic anhydride and one part by weight of benzyl dimethylamine.

11. furfuryl alcohol polymers in the form of a dark colored liquid, viscous, thixotropic polymer which is polymerized by using between one and 5 percent of a weak acid such as phosphoric acid;

12. coal tar pitches having a high coking value and suitable low viscosity for impregnation purposes, such as a specific natural coal tar pitch having a 150°C. softening point and a coking value of about 84 percent; and 13. a synthetic pitch/resin blend of isotruxene containing 60 parts by weight of a phosphoric acid-catalyzed furfuryl alcohol resin.

The following organic matrices are illustrative of the various types of matrices suitable in the practice of this invention.

Phenolic Resins:

Suitable phenolic resins used may be prepared from a base-catalyzed (ammonia) reaction of phenol and formaldehyde, with a molar excess of formaldehyde to yield a one state product soluble in alcohol. The prepolymers formed initially have molecular weights of about 600 to 800 and when cured they liberate approximately 5 to 6 percent volatiles comprised mainly of water. This one-step resole phenolic resin polymerizes essentially to completion upon the application of heat. A variety of phenols and aldehydes can be used to furnish modified phenolics. Typical phenols include phenol, cresols, xylenols, p-t-butylphenol, p-phenylphenol, bisphenol and resorcinol. Preferred aldehydes are formaldehyde and furfuryl aldehyde.

Polyimide Resins:

These aromatic-heterocyclic resins are condensation copolymers of an aromatic tetrabasic acid anhydride and an aromatic diamine. The most commonly used dianhydride is pyromellitic dianhydride, while the diamines are varied and include the phenylene diamines, diaminidiphenyls, diaminodiphenylethers, and others. The dianhydride and diamine are first reacted to yield a polyamide, which is soluble in solvents like N-methylpyrrolidone, dimethylformamide and dimethylacetamide. A typical polyamide acid resin solution contains 43 percent solids dissolved in a 2 to 1 by volume mixture of N-methylpyrrolidone and xylene. The resin solution has a viscosity of 10 to 20 poises at room temperature, a pH of 4.6, a dark amber color, and a shelf life of 12 months at about 5°C. The resin is B-staged on filamentous reinforcement by applying directly to the fiber, volatilizing the solvent, and curing the resin to a hard solid. A representative curing cycle involves vacuum resin impregnation for 20 minutes at 7 mm mercury pressure followed by a maximum cure temperature of 350°F. over a period of 5 hours. Composites are generally postcured under vacuum for eight hours and at 600°F. in circulation air or inert gas. One type of polyimide resin is sold under the trade designation PI 4701.

Polybenzimidazole Resins:

These aromatic-heterocyclic polymers are formed by the reaction of an aromatic tetraamine with an aromatic diacid or diacid derivative. A typical prepolymer is formed by the condensation reaction of 3,3'-diaminobenzidine and diphenyl isophthalate, with phenol as the by-product of the prepolymer formation. Such a prepolymer is available commercially as a finely ground powder, with a melting point of about 315°C. and a volatile content of about 10 percent maximum. A 100 percent solids content resin has a specific gravity of 1.33, a shelf life of about three months, and a gel time of about one minute at 315°C. The resin is applied to fibrous reinforcements by a hot melting technique, or by dissolving the prepolymer in a suitable solvent such as dimethyl formamide or N-methyl pyrollidone and impregnating filaments with this solution. The prepregged material is then B-staged and cured at temperatures on the order of 700°F. under about 200 psi and a period of about three hours. Postcuring of the resin is accomplished at a maximum temperature of 850°F. over several days and in an inert atmosphere such as nitrogen gas. Water is a by-product of the curing process. Such type of polybenzimidazole prepolymer described is marketed under the trade designation "Imidite 2801". A second type of polybenzimidazole prepolymer useful in this invention is marketed under the trade designation "Imidite 2803". This is a condensation product of isophthalamide and 3,3'-diaminobenzidine. Ammonia is a by-product of the prepolymer formation and water is a by-product of the curing process.

High Char Modified Phenolic Resin:

Phenolic resins containing a higher aromatic content than typical phenol formaldehyde resins are useful matrices. A typical resinous product is a copolymer of 2,7-naphthalenediol and o,o'-biphenol formaldehyde of the phenolic resole type. It is prepared with a molar ratio of 4 to 5 to 1 of o,o'-biphenol and 2,7-naphthalenediol reaction with formaldehyde in the presence of a basic catalyst. The resin has a specific gravity of 1.14 gm/cc, a 67 percent solids content in an ethyl alcohol solution, a pH of 5.3, and a viscosity of 525 centipoises. Typical resin curing conditions including a maximum temperature of 325°F. and 1000 psi pressure for one hour and a post-cure maximum temperature of 325°F. for 30 hours. Such resin is available commercially.

A second type of high char phenolic resin is a 2,7-naphthalenediol phenol formaldehyde, which is a terpolymer of 2,7-naphthalenediol, phenol and formaldehyde. It is advantageously prepared with a molar ratio of 2,7-naphthalenediol to phenol of 1 to 3 and in the presence of two percent barium hydroxide as a catalyst. The polymer is formed in ethanol as a phenolic lacquer of 75 percent solids. It has a specific gravity of 1.25, a solution viscosity of 87K centipoises, a gel time of 0.8 minutes at 150°C., and it is black in color. The resin is B-staged on filamentous reinforcement by diluting the solids contents to 45 percent using acetone solvent, air drying for two hours at 300°F. and then curing at a maximum temperature of 350°F. for 120 minutes at 300 psi pressure. Such resin is also available commercially.

Phenyl Silane Resin:

Siloxane modified phenolic resins combine the desirable char yield and strength of phenolic resins with the advantageous oxidative resistance of silicone resins. A typical phenyl silane resin contained in isopropyl alcohol solvent has a solids content of about 60 percent, a specific gravity of 1.06, and a viscosity of 180 to 350 centipoises. One type of phenyl silane resin is marketed under the trade designation of "Resinox SC-1013".

Polyamide-Imide Resin:

These aromatic-heterocyclic resins are formed by the condensation reaction of a trimellitic dianhydride and an aromatic diamine. The ortho-amic acid form of the polyamide is a yellow powder which has been dissolved in a 1 to 1 blend of methyl ethyl ketone and N-methyl-2-pyrrolidone solvents. The polyamide-imide resin has a specific gravity of 1.01 gm/cc, a 26 percent solids content in the aforementioned solvent, a solution viscosity of 210 centipoises and a gel time of 80 minutes at 135°C. The resin solution is B-staged on filamentous reinforcement at 175°F. for 15 minutes and at 300°F. for 15 minutes. It is cured to a rigid solid at 600°F. for 60 minutes and under a 300 psi pressure. This resin is also available commercially.

Polyphenylene Resins:

Soluble polyphenylene resins having molecular weights from about 1000 to 1500 are prepared by cationic oxidative polymerization of biphenyl and n-terphenyl in the presence of a catalyst mixture of aluminum chloride and cupric chloride. The fusible, soluble and branched polyphenylene polymers are mixed with xylylene glycol and toluene sulfonic acid to obtain a homogeneous lacquer solution. Specifically, 210 gm. of polyphenylene powder is stirred in 315 ml. of 1,1,2,2-tetrachloroethane, refluxed for one hour at 135°C., 945 ml. of trichloroethylene added, and the mixture refluxed for 4 hours. A second solution is formed by combining 70 gm. of para-xylylene glycol, 23.3 gm. of p-toluene sulfonic acid and 700 ml. of chloroform, refluxing with stirring for 20 hours and removing water with a trap. The polyphenylene solution is added to the second solution and refluxed for 20 hours at 75°C. with stirring. The resultant resin lacquer has a solids content of about 22 percent, a specific gravity of 1.42, a viscosity of 445 centipoises, and a gel time of 0.25 minutes at 200°C. The resin is B-staged on filamentous reinforcement by applying directly to the fiber, volatilizing the solvent and curing the resin to a hard solid. A typical curing cycle uses a maximum temperature of 400°F. for four hours under 300 psi pressure followed by postcuring in an argon atmosphere at a maximum temperature of 700°F. and over 20 hours. One type of polyphenylene resin is marketed under the trade designation "Abchar 413".

Epoxy Phenol Novalak:

This is a polyglycidyl ether of a polyhydric phenol, which is formed by forming glycidyl ether derivatives of a novalak type phenolic resin. The resultant resin has an average of 3.6 glycidyl or epoxy groups per molecule, a room temperature viscosity of 19,000,000 centipoises and a 125°F. viscosity of 35,000 to 70,000 centipoises, a specific gravity of 1.2 to 1.24, and a maximum volatile content of 0.5 percent. A liquid resin impregnation solution is prepared by combining with stirring 100 parts by weight of epoxy phenol novalak, 100 parts by weight of methyl nadic anhydride, and one part by weight of benzyl dimethylamine. An epoxy phenol novalak resin is marketed under the trade designation "D.E.N. 438". The methyl nadic anhydride is a liquid having a long pot life and is available commercially. The catalytic curing agent is benzyl-dimethylamine, also available commercially.

Furfuryl Alcohol Resin:

Furfuryl alcohol is a stable, low viscosity compound with a specific gravity of about 1.12 and a molecular weight of 98.1. A condensation resin can be obtained by catalyzation of furfuryl alcohol polymers with a weak acid. A typical example of a commercial product is the polymeric solution available as a dark colored, viscous, and trixotropic liquid, with approximate properties including a pH of 5.0 to 5.5, a viscosity of 5000 to 8000 centipoises, a hydroxyl number of 127, an acid number of 1.5, a water content of 0.40 percent and a molecular weight of above 350. The impregnating solution contains about 75 to 78 percent resin solids in an alcohol solvent. Polymerization is effected by adding between 1 and 5 percent of a weak acid selected from the group consisting of phosphoric, benzene sulfonic, maleic and oxalic. Resin curing is affected at temperatures of about 120°C.

Coal Tar Pitch:

Coal tar pitches are natural products which are widely used as the matrix in the formation of graphitic materials. A typical example is commercially available coal tar pitch with a 150°C. softening point. This material has the following approximate properties: 45.5 percent volatile matter, 37 percent insoluble in benzene, 18.6 percent insoluble in quinoline, ash content of 0.42, an elemental carbon content of 93.17 percent, a hydrogen content of 3.76 percent, an oxygen content of 1.25 percent, a nitrogen content of 1.1 percent, a sulfur content of 0.45 percent and a coking residual content of 84.2 percent. This pitch is preferably vacuum degassed prior to use and heated to 300°C. to reduce the viscosity for ease of impregnating the filamentous material.

Synthetic Pitch-Resin Blend:

An organic resinous blend of isotruxene and furfuryl alcohol resin provides an excellent matrix for filamentous reinforced composites and pyrolyzed plastic versions thereof. Isotruxene is a reaction product of 100 parts by weight of indene, ten parts by weigh of 1,4-naphthoquinone and one part by weight of an amine catalyst such as N,N,N',N'-tetramethyl-1,3-butanediamine. The mixture is refluxed for 24 hours at 180°C. with continuous removal of water. This is then cooled to 100°C. and an equal volume of methyl ethyl ketone added, the total mixture is cooled to 75°F., and the resinous material is collected by filtration. The isotruxene product has a carbon content of about 94.6 percent and fuses at 220° C. A mixture of isotruxene and furfuryl alcohol resin is then prepared as follows: In 60 parts by weight of phosphoric acid-catalyzed furfuryl alcohol solution is dissolved 40 parts by weight of finely ground isotruxene material. The resultant pitch/resin blend is a relatively low viscosity solution suitable for impregnating filamentous materials. Curing of the pitch/resin is effected in air at 250°C. Upon carbonization of the pitch/resin blend at 1000°C., the cured pitch/resinous material yields a char product having a specific gravity of 1.7 gm/cc.

Coal Tar Pitch-Resin Blend;

To facilitate filament impregnation at room temperature with a low viscosity resinous solution, coal tar pitches may be blended with organic resins and a suitable solvent. A typical pitch/resin blend is composed of (a) 250 gms. of 150°C. coal tar pitch, (b) 50 grams of furfuryl alcohol resin available commercially as "Varcum 8266" and (c) 10 grams of phosphoric acid accelerator in methanol, and the mixture dissolved in tetrahydrofuran (250 grams per liter). The resultant resinous solution is suitable for room temperature impregnation of filamentous material. This pitch/resin blend has a coking value of 50.9 percent.

Oxide filaments based on glass, fused silica, quartz and zirconia compositions are useful in the practice of this invention. However, quartz filaments are preferred because they offer the best combination of high strength, low thermal conductivity, low density and high ablative thermal efficiency. Representative properties of quartz filaments are: a density of 2.2 grams/cc, softening point of about 3200°F., tensile strength of about 800,000 pounds per square inch and a Young's modulus of about 10,000,000 pounds per square inch. The major deficiencies of quartz filaments are their relatively low bend strength (low modulus) and the material melted by a high temperature environment is subject to removal by surface shear forces (with an attendant decrease in ablative efficiency). All other known oxide filaments have lower viscosities in the molten state and thus experience higher ablation rates during ablative heating.

Carbon and graphite filaments derived from a variety of precursor organic filaments provide the desired high stiffness, thermal stability and low ablative recession characteristics. Carbon filaments are produced by pyrolysis processes in which various organic filament procursors are converted to elemental carbon. Several patents relating to the process for manufacturing same are: U.S. Pat. No. 2,916,905, W. Whitney; U.S. Pat. No. 3,011,981, W. Soltes; and U.S. Pat. No. 3,053,775, W. Abbott. Various filament precursors are used such as cellulose, viscose rayon, polyacrylonitrile, coal tar pitch, phenolic resin and other synthetic organics. Carbon filaments derived in this manner have densities ranging from about 1.45 to 1.53 gm/cc, filament strength from about 50,000 to 125,000 pounds per square inch (psi), a Young's modulus up to about 6,000,000 psi and filament diameters from about 4 to 15 microns.

A typical commercial carbon filament product has properties as follows: density of 1.53 gm/cc; tensile strength of 120,000 psi, Young's modulus of 6,000,000 psi; and an elemental carbon content of 90 percent. Further heat treatment of these carbon filaments at temperatures up to about 2700°C. produces a graphite filament.

Typical graphite filament properties include: densities from about 1.5 to 1.8 gm/cc; diameters from about 4 to 15 microns; tensile strength from 50,000 to 150,000 psi; and Young's modulii from 4,000,000 to 9,000,000 psi. A typical commercial graphite filament has properties as follows: density of 1.5 gm/cc; tensile strength of 90,000 psi; Young's modulus of 6,000,000 psi; and an elemental carbon content of 99 percent. A typical method of manufacturing graphite filaments is disclosed in U.S. Pat. No. 3,107,152, Ford et al.

Pyrolyzing organic filaments under tension results in a stress graphitized filament having improved modulus and strengths properties. Filament precursors are identical to those previously described, with viscose rayon and polyacrylonitrile filaments the preferred precursors. These filaments have typical properties of: densities from 1.50 to 1.93 gm/cc; tensile strengths from about 20,000 to 50,000 psi; elastic modulii values from about 25,000,000 to 80,000,000 psi; and filament diameters from 6 to 8 microns. A typical commercial high modulus graphite filament has properties as follows: density of 1.72 gm/cc; diameter of 6.6 microns; tensile strength of 310,000 psi; Young's modulus of 50,000,000 psi; and an elemental carbon content of 99.9 percent.

Typical quartz, carbon and graphite filaments suitable for fabricating the central rod of the nose tips are described as follows:

Quartz Filaments:

Continuous quartz in yarn form is available commercially which exhibits high strength characteristics. A typical high strength quartz yarn is Type 300–1/2, which is two ply, has an approximate diameter of 0.0008 inch, and has an approximate breaking strength of 1.5 pounds. Individual quartz filaments have the following approximate properties: over 99 weight percent silica, a softening point of 3032°F., a strain point of 1958°F., a specific heat of 0.165 BTU/lb–°F., a specific gravity of 2.2, tensile strength of about 800,000 psi, and a Young's modulus of about 10,500,000 psi.

High Modulus Carbon Filaments:

Continuous carbon filaments in yarn form and possessing essentially amorphous structure are available with high strength, high modulus characteristics. A typical high modulus carbon yarn is marketed as "Modmor II". The yarn is comprised of about 10,000 individual filaments per tow, with each filament having as typical properties: a density of about 1.74, a tensile strength of about 400,000 psi, an elastic modulus of about 40,000,000 psi, a diameter of 7.5 microns, and one percent elongation at break.

High Modulus Graphite Filaments:

Continuous graphite filaments in yarn form and possessing an oriented graphitic structure are available with high modulus, high strength characteristics. A typical high modulus graphite yarn is designated commercially as Type WYG 130–1/2. The graphite yarn is composed of two plies with each ply containing 720 filaments. The individual filaments have as typical properties: a density of 1.63, a tensile strength of 285,000 psi, an elastic modulus of 50,000,000 psi, and a diameter of 6.6 microns.

Nose tip housings are fabricated from either quartz, carbon or graphite fabric reinforced resinous composities or pyrolyzed versions thereof. Carbon fabrics are typically either a square or satin woven construction and composed of low modulus carbon filaments. Graphite fabrics are composed of either low or high modulus graphite filaments which have been woven into either a square or satin woven construction.

Typical woven fabrics suitable as the reinforcement in the plastics and pyrolyzed plastic nose tip housings of this invention are described below:

Quartz Fabric:

Quartz fabric is woven from continuous filament yarn in either a square or satin woven construction. The quartz filaments are obtained by a hot melt drawing of quartz, and hence differ from silica filaments which are produced by acid leaching and heat treatment of glass filaments. A typical quartz fabric used in the practice of this invention is available commercially under the designation "Style 570". This particular quartz fabric is a 5 hardness satin weave, has a thickness of 0.027 inch, weighs 19.5 oz/sq yd, has a thread count per inch of 38 (warp) by 24 (fill) and a tensile breaking strength of 480 (warp) by 400 (fill) lb/in. width of fabric.

Carbon Fabric:

Carbon fabric is woven from continuous carbon filament yarn or prepared by pyrolyzing viscose rayon fabric. It is available commercially in either square or satin woven construction. A typical carbon fabric, as used in the examples of the subject invention, is "Type CCA-1 1641". This carbon fabric has a specific gravity of from 1.8 to 1.9, an ash content of 0.2 percent, a moisture content of 1.5 percent, a weight of 8.3 oz/sq yd, a surface resistivity of about 0.5 to 1.0 ohms/sq in, a break strength of 39 lb/in. in the warp direction and 32 lb/in. in the fill direction, a fabric thickness of about 0.017 in., and no finish or size.

Graphite Fabric:

Graphite fabric is woven from continuous graphite filament yarn, or it is prepared by pyrolyzing viscose rayon fabric at temperatures up to about 2500°C. The graphite fabric is available in either square or satin woven construction. A typical graphite fabric, which is suitable for preparing graphite fabric reinforced plastic and pyrolyzed plastic composites, is designated commercially as Grade WCA. This square woven fabric is composed of the following approximate properties: a carbon content of 99.9 percent, a pH between 6 and 10, a tensile breaking strength of 10 pounds per inch width for both the warp and fill directions, weight between 6.0 and 8.5 oz/sq yd, a specific gravity between 1.38 and 1.48, a thread count of 24 to 30 threads per inch in the warp direction and 20 to 26 threads per inch in the fill direction, and a thickness between 0.019 and 0.028 inch.

Typical Graphite Fiber Reinforced Graphite Composite

The central core used in Example VI of this application may be manufactured in the following manner. A viscose rayon mat is needle punched perpendicular to the major fiber axis, thereby placing about 20 percent of the fibers in a third or vertical direction. The material is then heated in flowing argon to carbonize and finally infiltrated with pyrolytic carbon or graphite to reduce the porosity of the fibrous skeleton.

Precursor viscose rayon needled felt is available commercially. It is a three dimensional filamentous reinforcement prepared with viscose rayon fibers having a fiber diameter of about 20 microns and a fiber length between 35 and 50 millimeters. The resultant needled rayon felt is pyrolyzed in an electric furnace at a maximum temperature of 1200°C., over a period of 25 hours, and in the presence of an inert gas like argon. In the pyrolysis process, the felt loses 82 percent of its weight, shrinks about 32 percent, undergoes a volume reduction of about 65 percent, and has a final density of 0.10 to 0.18 gm/cc. Carbonized rayon felts similar to that described are also commercially available.

Chemically vapor-deposited carbon reinforced carbon fibers are produced by the use of an induction heater, a cylindrical graphite susceptor coupled to a water-cooled induction coil and removal graphite kiln — all surrounded by a water-cooled steel vacuum shell.

A typical chemical vapor deposition process involves placing the porous fibrous carbon reinforcement in a vacuum furnace, evacuating to one to 50 mm of mercury pressure, and radiation heating to 1850° to 2600°F. As methane gas, diffused with equal weight of hydrogen gas, permeates the heated carbon fibrous skeleton, it is pyrolyzed to elemental carbon and is deposited onto the filaments. The fibrous substrate is maintained either at a constant temperature or a gradient temperature to facilitate pyrolytic deposition. In the gradient temperature deposition process the methane gas flows from the external perimeter through the colder fibrous reinforcement side, contacts the hotter inner surface, and then deposits pyrolytic carbon from the inner to outer surface. Depending upon the thickness of the carbonized felt to be infiltrated the pyrolytic deposition is carried out slowly to maximize density and minimize voids in the final composite. A typical deposition time is in the order of 20 to 30 hours. The composite is then subjected to a graphitization cycle to improve its properties. A typical graphitization is carried out at 2900°C. for two hours and in the presence of a vacuum or inert gas (argon). Properties of the resultant graphite fiber reinforced graphite matrix composite will vary considerably with the materials and processing conditions employed, but typical properties are a bulk density of 1.80 gm/cc, a flexural strength of 18,000 psi parallel to major fiber axes, and a compressive strength of 12,000 psi in the same direction. Products of these types are marketed as "Reinforced Pyrolytic Graphite".

While certain features of this invention have been described in detail with respect to various embodiments thereof, it will, of course, be apparent that other modifications can be made within the spirit and scope of this invention.

I claim:

1. A nose tip suitable for use in high speed flight within a planetary atmosphere comprising a rod-shaped composite of unidirectional filaments substantially parallel to each other and for a substantial portion of the length thereof oriented substantially parallel to the central axis of the nose tip, said filaments being bound together with a matrix material; at least one wedge-shaped composite of unidirectional filaments substantially parallel to each other and bound together with a matrix, said wedge-shaped composite being disposed in one end of said rod-shaped composite to flare said end; and a round, arcuate cap formed on said flared end of said rod-shaped composite.

2. A nose tip according to claim 1 in which said filaments are formed of a material selected from the group consisting of quartz, carbon, graphite glass, silica and boron nitride.

3. A nose tip according to claim 2 in which said matrix material is selected from the group consisting of chemically vapor deposited carbon or graphite, phenol-formaldehyde resin, polybenzimidazole resin, polyimide resin, graphitized phenol-formaldehyde, graphitized polybenzimidazole and graphitized polyimide.

4. A nose tip according to claim 3 in which said matrix comprises from 20 to 50 weight percent of said rod-shaped composite and said wedge-shaped composite.

5. A nose tip assembly suitable for use in high speed flight through a planetary atmosphere comprising an elongated housing having an upstream end and a downstream end; a passageway formed in said housing so that its longitudinal axis substantially coincides with the longitudinal axis of said housing; a rod-shaped composite of unidirectional filaments substantially parallel to each other and for a substantial portion of the length thereof oriented substantially parallel to the longitudinal axis of said passageway, said filaments being bound together with a matrix material and said rod-shaped composite being fixedly positioned in said passageway; and at least one wedge-shaped composite of unidirectional filaments substantially parallel to each other and bound together with a matrix material, said wedge-shaped composite being disposed in one end of said rod-shaped composite so as to flare said end and form a round arcuate cap, said flared end being seated in a correspondingly shaped recess in the upstream end of said housing.

6. A nose tip assembly according to claim 5 in which said passageway has an upstream portion having a smaller diameter than a downstream portion; said rod-shaped composite is positioned in said upstream portion of said passageway with its end extending into said downstream portion; locking means is attached to said end extending into said downstream portion; insulation material surrounds said locking means; a heavy metal ballast is disposed in said downstream portion of said passageway and abutting said end of rod member extending thereinto; and a structural shell is positioned in said downstream portion of said passageway downstream of said ballast, said shell being attached to said ballast and wall of said passageway.

7. A nose tip assembly according to claim 5 in which said filaments are formed of a material selected from the group consisting of quartz, carbon, graphite, glass, silica and boron nitride and in which said matrix material is selected from the group consisting of chemically vapor deposited carbon or graphite, phenol-formaldehyde resin, polybenzimidazole resin, polyimide resin, graphitized phenol-formaldehyde resin, graphitized polybenzimidazole resin and graphitized polyimide resin.

8. A nose tip assembly according to claim 5 in which said housing comprises (a) fabric or fiber reinforcement selected from the group consisting of quartz, carbon and graphite, said reinforcement being oriented substantially perpendicular to surfaces of said housing; and (2) a matrix material selected from the group consisting chemically vapor deposited carbon or graphite, phenol-formaldehyde resin, polybenzimidazole resin, polyimide resin, graphitized phenol-formaldehyde resin, graphitized polybenzimidazole resin, and graphitized polyimide resin.

9. A nose tip assembly according to claim 5 in which the sides of the end of the rod-shaped composite are flared at an angle of about 40° to 50° with the axis of the rod-shaped composite.

* * * * *